US010939341B1

(12) United States Patent
Manganiello et al.

(10) Patent No.: US 10,939,341 B1
(45) Date of Patent: Mar. 2, 2021

(54) DONOR SELECTION FOR RELAY NODES COMPRISING DIRECTIONAL ANTENNAE

(71) Applicant: Sprint Spectrum LLP, Overland Park, KS (US)

(72) Inventors: Charles Manganiello, Paola, KS (US); Amrit Kumar Chandra, Ashburn, VA (US); Jay R Chernoff, Pawleys Island, SC (US); Kristian Kai Johns, Ashburn, VA (US); Vanil Parihar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 52 days.

(21) Appl. No.: 16/427,381

(22) Filed: May 31, 2019

(51) Int. Cl.
| H04W 36/08 | (2009.01) |
| H04W 36/16 | (2009.01) |
| H04W 72/06 | (2009.01) |
| H04B 17/382 | (2015.01) |
| H04B 17/318 | (2015.01) |
| H04W 36/30 | (2009.01) |

(52) U.S. Cl.
CPC .......... *H04W 36/08* (2013.01); *H04B 17/318* (2015.01); *H04B 17/382* (2015.01); *H04W 36/165* (2013.01); *H04W 36/30* (2013.01); *H04W 72/06* (2013.01)

(58) Field of Classification Search
CPC ... H04W 36/08; H04W 36/165; H04W 36/30; H04W 72/06; H04B 17/318; H04B 17/382
See application file for complete search history.

(56) References Cited

U.S. PATENT DOCUMENTS

| 9,049,627 | B2 | 6/2015 | Teyeb et al. | |
| 9,603,083 | B2 | 3/2017 | Yang et al. | |
| 10,616,824 | B2* | 4/2020 | Dudzinski | H04W 76/10 |
| 2006/0229076 | A1* | 10/2006 | Monk | H04W 16/28 455/442 |
| 2008/0188177 | A1* | 8/2008 | Tan | H04B 7/2606 455/11.1 |
| 2013/0102312 | A1* | 4/2013 | Nilsson | H04W 16/28 455/436 |
| 2013/0183971 | A1 | 7/2013 | Tamaki et al. | |
| 2019/0014514 | A1* | 1/2019 | Sundberg | H04W 36/0072 |

* cited by examiner

*Primary Examiner* — Kashif Siddiqui

(57) ABSTRACT

Systems, methods, and processing nodes for selecting a donor access node for a relay node comprising a plurality of directional antennae include instructing the relay node to attach to a first preferred donor access node using a first antenna of the plurality of directional antennae. While maintaining the connection with the first preferred donor access node using the first antenna, the relay node can scan for potential donor access nodes using one or more remaining antennae of the plurality of directional antennae and, upon identifying a second preferred donor access node from the potential donor access nodes, to perform a handover from the first preferred donor access node to the second preferred donor access node.

19 Claims, 8 Drawing Sheets

DONOR SELECTION FOR RELAY NODES COMPRISING DIRECTIONAL ANTENNAE

TECHNICAL BACKGROUND

As wireless networks evolve and grow, there are ongoing challenges in providing high-quality service to increasing numbers of wireless devices in various coverage areas of a wireless network. One approach to improving service quality and coverage is to implement relay nodes for relaying communication between a base station or donor access node, and an end-user wireless device. Combinations of wireless devices designated as relays (henceforth, "relay wireless devices") that are co-located with relay access points may be used at the edge of a coverage area of a donor access node to improve coverage and/or service, as well as in crowded areas having a high number of other wireless devices to increase the available throughput to the end-user wireless devices being relayed.

However, with the increasing implementation of various access nodes and overlapping radio access technologies (RATs) such as 5G New Radio (NR) over existing RATs such as 3G and 4G Long Term Evolution (LTE), there are additional considerations regarding how relay nodes can effectively service wireless devices that are attached to it. In particular, when a relay node attempts to select a donor access node from among a plurality of different donor access nodes, the relay node must drop a connection with a serving donor access node in order to properly perform signal measurements of nearby donor access nodes. This causes service interruptions to users of wireless devices connected to the relay node, and unnecessary signaling to disconnect and reconnect between donor access nodes.

Overview

Exemplary embodiments described herein include systems, methods, and processing nodes for selecting a donor access node for a relay node comprising a plurality of directional antennae. An exemplary method for selecting a donor access node for a relay node comprising a plurality of directional antennae includes attaching to a first preferred donor access node using a first antenna of the plurality of directional antennae, while maintaining the connection with the first preferred donor access node using the first antenna, scanning for potential donor access nodes using one or more remaining antennae of the plurality of directional antennae and, upon identifying a second preferred donor access node from the potential donor access nodes, performing a handover from the first preferred donor access node to the second preferred donor access node.

An exemplary system for selecting a donor access node for a relay node comprising a plurality of directional antennae includes a processing node, and a processor coupled to the processing node. The processor can be configured to perform operations including instructing a relay node to attach to a first preferred donor access node from among a plurality of potential donor access nodes using a first directional antenna. While maintaining the connection with the first preferred donor access node using the first directional antenna, the relay node may be instructed to identify additional preferred donor access nodes from among the plurality of potential donor access nodes using a second directional antenna, rank the additional preferred donor access nodes and the first preferred donor access node based on a signal strength from each donor access node, and perform or request a handover from the first preferred donor access node to a highest-ranked additional preferred donor access node.

An exemplary processing node for selecting a donor access node for a relay node comprising a plurality of directional antennae is configured to perform operations including identifying a first preferred donor access node from among a plurality of potential donor access nodes, attaching to the first preferred donor access node using a first directional antenna, while maintaining the connection with the first preferred donor access node, identifying additional preferred donor access nodes from among the plurality of potential donor access nodes using one or more additional directional antennae, and ranking the additional preferred donor access nodes and the first preferred donor access node based on a signal strength received at each of the first directional antennae and the one or more additional directional antennae. A handover is performed from the first preferred donor access node to a second preferred donor access node upon identifying the second preferred donor access node from among the additional preferred donor access nodes.

DETAILED DESCRIPTION

Figure 1:
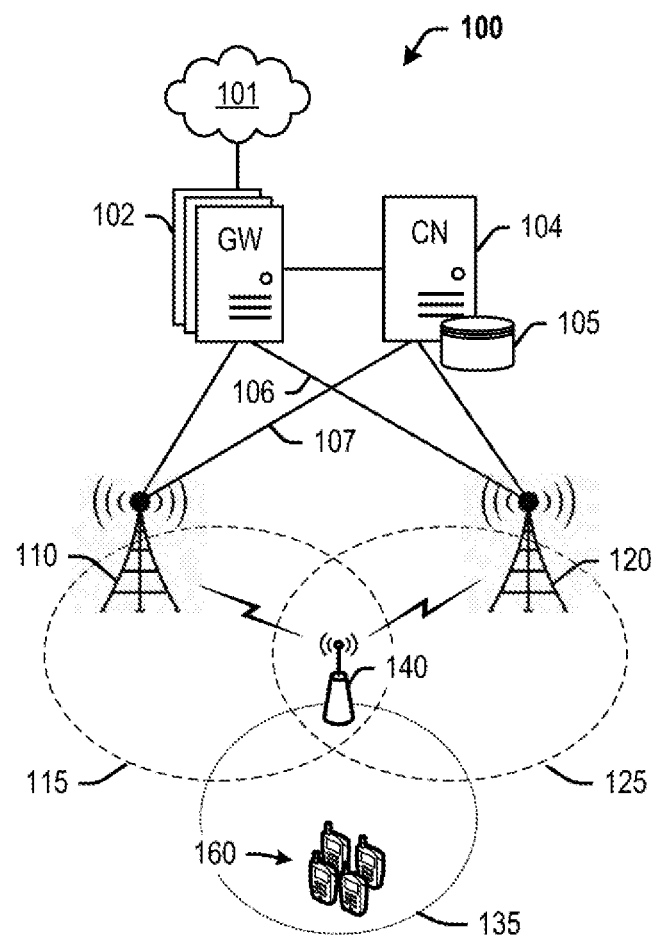
FIG. 1 depicts an exemplary system for selecting a donor access node for a relay node comprising a plurality of directional antennae.

A method for selecting a donor access node for a relay node comprising a plurality of directional antennae includes instructing the relay node to attach to a first preferred donor access node using a first antenna of the plurality of directional antennae. While maintaining the connection with the first preferred donor access node using the first antenna, the relay node can scan for potential donor access nodes using one or more remaining antennae of the plurality of directional antennae and, upon identifying a second preferred donor access node from the potential donor access nodes, to perform a handover from the first preferred donor access node to the second preferred donor access node. In exemplary embodiments described herein, the relay node can be configured to relay data between an access node and one or more end-user wireless devices attached to the relay node. The relay node may be a small cell access node, a home eNodeB, etc. In an exemplary embodiment, the relay node includes a relay wireless device coupled to a relay access point, and is configured to relay data packets between an access node and an end-user wireless device attached to a wireless air interface deployed by the relay access point. Alternatively, the relay node is a combined unit that includes transceivers configured to communicate with a relay node and to deploy a wireless air interface to which end-user wireless devices can attach. In either case, when providing service to a relay node, the serving access node(s) may be referred to as donor access node(s), and any wireless connection between a donor access node and a relay node may be referred to as a backhaul connection. Further, the donor access node may include an access node of any type, including macrocell access nodes such as Long-Term-Evolution (LTE) eNodeBs or 5G New Radio (NR) gNodeBs, mini access nodes, home eNodeBs or gNodeBs, etc.

Further, as described herein, the relay node is configured with a plurality of directional antennae, each of which is oriented such that the relay node can communicate with other network nodes in all directions. Thus, according to exemplary embodiments described herein, while being connected to the first preferred access node using the first directional antenna, the relay node is configured to scan for potential access nodes using the one or more remaining directional antennae by scanning for reference signals transmitted from the potential donor access nodes. The scanning may be performed by switching to different directional antennae in different directions, and performing measurements from each different antenna prior to switching to the next directional antenna. Further, the relay node is configured to record reference signal strengths for each reference signal received at the one or more remaining antennae. For example, the reference signal strengths for each reference signal can be recorded on an internal database of the relay node, along with a primary cell identifier of each potential donor access node that transmitted the reference signal. Further, the scanning and recording can be repeated for the duration of a timer. Subsequent to expiration of the timer, the potential donor access nodes can be ranked based on the reference signal strength. In an exemplary embodiment, the scanning, recording, and ranking operations can be repeated for the duration of a second timer. The second timer can be longer than the first timer. In an exemplary embodiment, the second timer is an integer multiple of the first timer. For example, upon meeting a predefined number of cycles of the first timer during which scanning and recording operations are performed, the recorded list of potential donor access nodes can be ranked by a signal strength.

In an exemplary embodiment, the first preferred donor access node is selected based on having a top rank. The top rank may be based on, for example, past records of signal measurements. Further, identifying the second preferred donor access node may be based on a rank of the second preferred donor access node being higher than (or rising higher than) a rank of the first preferred donor access node to which the relay node is attached. For example, the reference signal strength associated with the second preferred donor access node and measured at the remaining one or more directional antennae may be higher than the reference signal strength associated with the first preferred donor access node. Further, to be selected as a preferred donor access node, the reference signal strength associated with the second preferred donor access node may be higher than the reference signal strength associated with the first preferred donor access node by a threshold. Alternatively, or in addition, the reference signal strength associated with the second preferred donor access node may be higher than the reference signal strength associated with the first preferred donor access node for a period of time, or over a threshold number of cycles of one or more timers. Consequently, upon identifying the second preferred donor access node, the relay node initiates a handover from the first preferred donor access node to the second preferred donor access node. Thus, utilizing multiple directional antennae to maintain a connection with the serving access node while measuring signal levels from other potential access nodes solves the above-identified problems with respect to disconnecting from the serving access node in order to perform such measurements.

Similar operations may be performed by an exemplary system described herein and comprising at least a processing node and a processor coupled to the processing node. A processing node in such an exemplary system may be configured to perform operations including instructing a relay node to attach to a first preferred donor access node from among a plurality of potential donor access nodes using a first directional antenna. While maintaining the connection with the first preferred donor access node using the first directional antenna, the relay node may be instructed to identify additional preferred donor access nodes from among the plurality of potential donor access nodes using a second directional antenna, rank the additional preferred donor access nodes and the first preferred donor access node based on a signal strength from each donor access node, and perform or request a handover from the first preferred donor access node to a highest-ranked additional preferred donor access node. In an exemplary embodiment, the first preferred donor access node is selected based on a past signal strength. Further, identifying the additional preferred donor access nodes comprises scanning for reference signals transmitted from each additional preferred donor access node. The operations can further comprise recording reference signal strengths for each reference signal received at the second antenna, and correlating each recorded reference signal strength with the corresponding each additional preferred donor access node. Further, the additional preferred donor access nodes are ranked based on the signal strength from each donor access node exceeding another signal strength by a threshold. For example, to outrank a first preferred donor access node, a second preferred donor access node may have a reference signal strength higher than the reference signal strength associated with the first preferred donor access node by a threshold amount, or for longer than a threshold period of time.

Similar operations may be performed by a processing node communicatively coupled to any other network node within the wireless network. The processing node can be coupled to a relay node. Consequently, an exemplary processing node can be configured to perform operations including identifying a first preferred donor access node from among a plurality of potential donor access nodes, attaching to the first preferred donor access node using a first directional antenna, while maintaining the connection with the first preferred donor access node, identifying additional preferred donor access nodes from among the plurality of potential donor access nodes using one or more additional directional antennae, and ranking the additional preferred donor access nodes and the first preferred donor access node based on a signal strength received at each of the first directional antennae and the one or more additional directional antennae. A handover is performed from the first preferred donor access node to a second preferred donor access node upon identifying the second preferred donor access node from among the additional preferred donor access nodes. As described herein, identifying the additional preferred donor access nodes comprises scanning for reference signals transmitted from each additional preferred donor access node. The operations further include recording reference signal strengths for each reference signal received at the one or more additional directional antennae.

These and other embodiments are further described herein and with reference to FIGS. 1-8.

FIG. 1 depicts an exemplary system 100 comprising a communication network 101, gateway 102, controller node 104, access node 110, access node 120, relay node 140, and end-user wireless devices 160. Access node 110 is configured to deploy a radio air interface over a coverage area 115, and access node 120 is configured to deploy a radio air interface over a coverage area 125. By virtue of being within both coverage areas 115 and 125, relay node 140 can be in direct communication with either or both access nodes 110, 120. Further, relay node 140 may be configured to deploy another carrier over a coverage area 135 to which end-user wireless devices 160 can attach. Relay node 140 can be configured to relay data packets between end-user wireless devices 160 and one or both of access nodes 110, 120, which may be referred to as "donor" access nodes when communicating via relay node 140. Thus, wireless devices 160 that are outside a coverage area of donor access nodes 110, 120 may access network services from donor access nodes 110, 120 by virtue of being connected to relay node 140.

Moreover, a processing node within system 100 (for example, communicatively coupled to access nodes 110, 120, controller node 104, relay node 140, or any other network node) can be configured to select a donor access node for relay node 140 from among donor access nodes 110, 120, by instructing the relay node 140 to attach to a first preferred donor access node (e.g. donor access node 110) using a first antenna of the plurality of directional antennae. While maintaining the connection with the first preferred donor access node 110 using the first antenna, the relay node 140 can scan for potential donor access nodes (including donor access node 120) using one or more remaining antennae of the plurality of directional antennae and, upon identifying potential donor access node 110 as a second preferred donor access node, perform a handover from the first preferred donor access node 110 to the second preferred donor access node 120. By virtue of being configured with a plurality of directional antennae, the relay node 140 can remain connected to the first preferred access node 110 using the first directional antenna while scanning for potential donor access nodes 120 using the one or more remaining directional antennae. For example, relay node 140 can scan for reference signals transmitted from the potential donor access node 120. The scanning may be performed by switching to different directional antennae in different directions and performing measurements from each different antenna prior to switching to the next directional antenna.

Further, the relay node 140 is configured to record reference signal strengths for each reference signal received at the one or more remaining antennae. For example, the reference signal strengths for each reference signal can be recorded on an internal database of the relay node 140, along with a primary cell identifier of each potential donor access node 120 (and others not shown herein) that transmitted the reference signal. Further, the scanning and recording can be repeated for the duration of a timer. Subsequent to expiration of the timer, the potential donor access nodes (including both donor access node 110 and donor access node 120) can be ranked based on the reference signal strength. In an exemplary embodiment, the scanning, recording, and ranking operations can be repeated for the duration of a second timer. The second timer can be longer than the first timer. In an exemplary embodiment, the second timer is an integer multiple of the first timer. For example, upon meeting a predefined number of cycles of the first timer during which scanning and recording operations are performed, the recorded list of potential donor access nodes 110, 120 can be ranked by a signal strength.

In an exemplary embodiment, the first preferred donor access node 110 is selected by relay node 140 based on having a top rank. The top rank may be based on, for example, past records of signal measurements. Further, identifying the second preferred donor access node 120 may be based on a rank of the second preferred donor access node being higher than (or rising higher than) a rank of the first preferred donor access node 110 to which the relay node 140 is attached. For example, the reference signal strength associated with the second preferred donor access node 120 and measured at the remaining one or more directional antennae of relay node 140 may be higher than the reference signal strength associated with the first preferred donor access node 110. Further, to be selected as a preferred donor access node, the reference signal strength associated with the second preferred donor access node 120 may be higher than the reference signal strength associated with the first preferred donor access node 110 by a threshold. Alternatively, or in addition, the reference signal strength associated with the second preferred donor access node 120 may be higher than the reference signal strength associated with the first preferred donor access node 110 for a period of time, or over a threshold number of cycles of one or more timers. Consequently, upon identifying the second preferred donor access node, the relay node 140 initiates a handover from the first preferred donor access node 110 to the second preferred donor access node 120.

Access nodes 110, 120 can be any network node configured to provide communication between relay node 140 and other wireless devices (not shown herein) and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area 115, 125 in the range of approximately five kilometers to thirty-five kilometers and an output power in the tens of watts. Further, relay node 140 may comprise any combination of a relay wireless device capable of communicating over a wireless backhaul, and a small-cell access node capable of deploying a wireless air interface for wireless devices 160. Relay node 140 may comprise any short range, low power, small-cell access nodes such as a microcell access node, a picocell access node, a femtocell access node, or a home eNodeB device.

Access nodes 110, 120 and relay node 140 can comprise a processor and associated circuitry to execute or direct the execution of computer-readable instructions to perform operations such as those further described herein. Briefly, access nodes 110, 120 and relay node 140 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 and relay node 140 can receive instructions and other input at a user interface. Access nodes 110, 120 communicate with gateway node 102 and controller node 104 via communication links 106, 107. Access nodes 110, 120 may communicate with each other, and other access nodes (not shown), using a wireless link or a wired link such as an X2 link. Components of exemplary access nodes 110, 120, relay node 140, and processing nodes coupled thereto, are further described with reference to FIGS. 2-5.

Wireless devices 160 may be any device, system, combination of devices, or other such communication platform capable of communicating wirelessly with access node 110, 120 and/or relay node 140 using one or more frequency bands deployed therefrom. Each of wireless devices 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by relay node 140 and wireless devices 160. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as historical signal levels of access nodes 110, 120, capabilities of relay node 140, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication systems 100 may be, comprise, or include computers systems and/or processing nodes. This includes, but is not limited to: access nodes 110, 120, relay node 140, controller node 104, and/or networks 101, 201.

Figure 2:
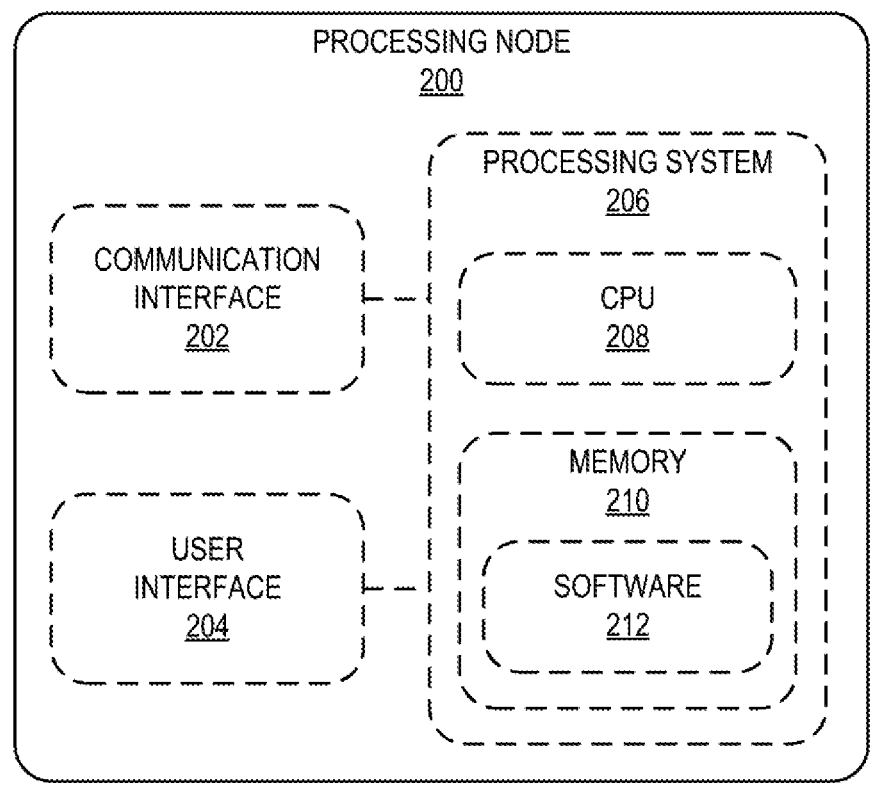
FIG. 2 depicts an exemplary processing node.

FIG. 2 depicts an exemplary processing node 200 for mitigating interference. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store a software 212, which may be executed to perform the interference mitigation operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 can include instructions for instructing a relay node with a plurality of directional antennae to attach to a first preferred donor access node using a first antenna of the plurality of directional antennae. While maintaining the connection with the first preferred donor access node using the first antenna, the relay node can scan for potential donor access nodes using one or more remaining antennae of the plurality of directional antennae and, upon identifying a second preferred donor access node from the potential donor access nodes, to perform a handover from the first preferred donor access node to the second preferred donor access node.

In another exemplary embodiment, software 212 can include instructions for instructing a relay node to attach to a first preferred donor access node from among a plurality of potential donor access nodes using a first directional antenna. While maintaining the connection with the first preferred donor access node using the first directional antenna, the relay node may be instructed to identify additional preferred donor access nodes from among the plurality of potential donor access nodes using a second directional antenna, rank the additional preferred donor access nodes and the first preferred donor access node based on a signal strength from each donor access node, and perform or request a handover from the first preferred donor access node to a highest-ranked additional preferred donor access node.

In another exemplary embodiment, software 212 can include instructions for identifying a first preferred donor access node from among a plurality of potential donor access nodes, attaching to the first preferred donor access node using a first directional antenna, while maintaining the connection with the first preferred donor access node, identifying additional preferred donor access nodes from among the plurality of potential donor access nodes using one or more additional directional antennae, and ranking the additional preferred donor access nodes and the first preferred donor access node based on a signal strength received at each of the first directional antennae and the one or more additional directional antennae. A handover is performed from the first preferred donor access node to a second preferred donor access node upon identifying the second preferred donor access node from among the additional preferred donor access nodes.

Figure 3:
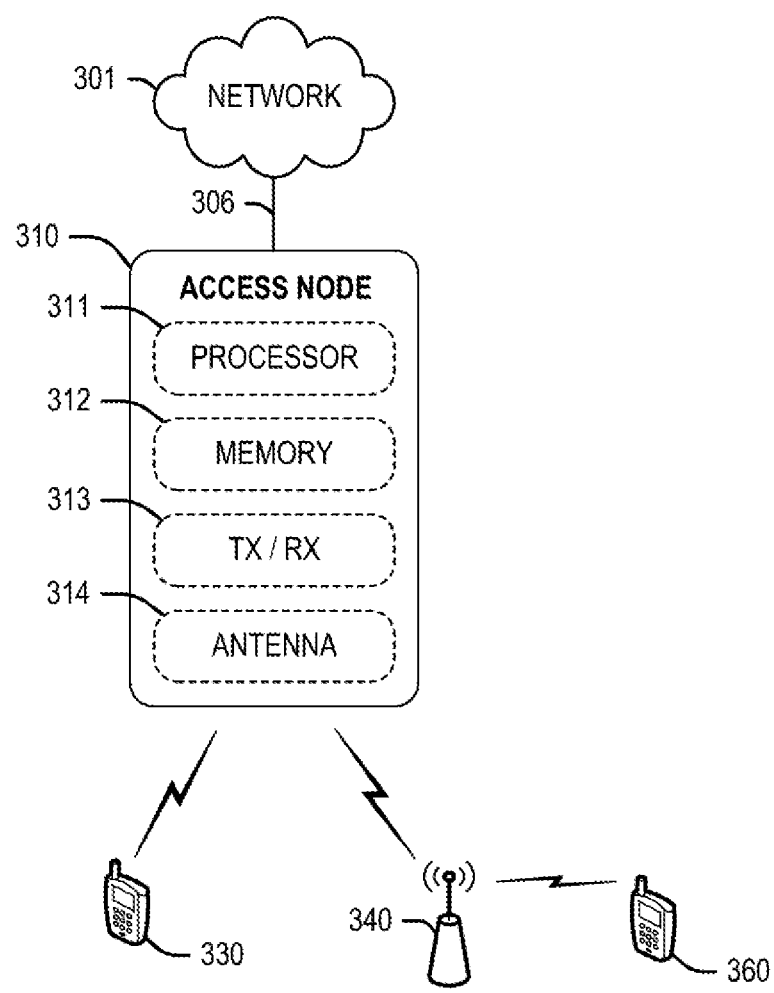
FIG. 3 depicts an exemplary access node.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, transceiver 313, and antenna 314. Processor 311 executes instructions stored on memory 312, while transceiver 313 and antenna 314 enable wireless communication with wireless device 330 and relay node 340. Further, antenna 314 may include an array of antennae that are configured to deploy a radio air interface over one or more wireless sectors, form beams within these sectors, employ multiple-input-multiple-output (MIMO), etc.

Figure 4:
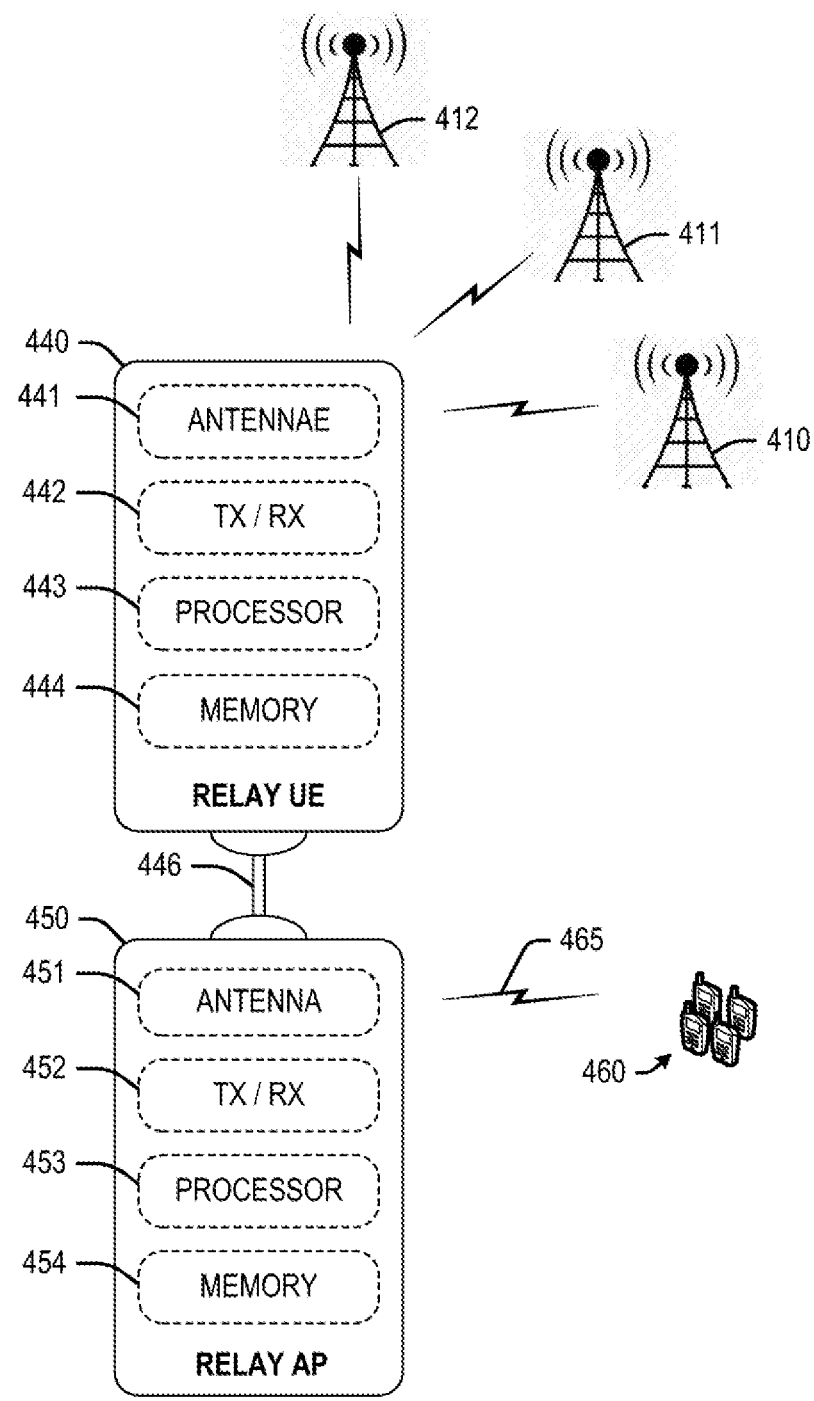
FIG. 4 depicts an exemplary relay node comprising a relay wireless device and a relay access point.

FIG. 4 depicts an exemplary relay node comprising a relay wireless device 440 and a relay access point (AP) 440. Relay wireless device 440 is illustrated as comprising a plurality of directional antennae 441 enabling communication with a plurality of donor access nodes 410, 411, 412, one or more transceivers 442, a processor 443, and a memory 444 for storing instructions that enable relay wireless device 440 to perform operations described herein. In some embodiments, relay wireless device 440 is referred to as a customer premise equipment (CPE), which includes any stationary LTE and/or 5G NR wireless device having a stronger computational & RF capability versus standard wireless devices, as well as a directional antenna and a dedicated power supply, enabling relay wireless device 440 to efficiently provide resources to wireless devices 460 via relay access point 450. Consequently, relay access point 450 may be co-located with relay wireless device 440, and is connected to relay wireless device 440 via a communication interface 446. Communication interface 446 may be any interface that enables direct communication between relay wireless device 440 and relay access point 450, such as USB, FireWire, Ethernet, or any other serial, parallel, analog, or digital interface.

In operation, relay wireless device 440 may be configured to relay network services from donor access nodes 410, 411, 412 to wireless devices 460 via relay access point 450. Relay wireless device 440 may begin to function as a relay wireless device by sending a message to donor access nodes 410, 411, 412 to indicate to donor access nodes 410, 411, 412 that wireless device 440 is functioning as a relay wireless device. In some embodiments, relay wireless device 440 can request to send a buffer status report to donor access nodes 410, 411, 412. Donor access nodes 410, 411, 412 can grant this request in a conventional manner. Relay wireless device 440 may respond to the grant by sending a short buffer status report.

This short buffer status report is associated with a logical channel group that indicates the buffer status report is communicating the status of relay wireless device 440 as a relay, and thus is not asking for additional resource allocations (like a 'conventional' buffer status report would indicate). In other words, when relay wireless device 440 responds with a buffer status report for the 'special' logical channel group, it means that the buffer status report is not actually reporting the status of a buffer. Rather, this buffer status report indicates that the wireless device is now functioning as a relay. Once status of relay wireless device 440 is established, relay wireless device 440 may instruct relay access point 450 to start accepting connection requests from one or more wireless devices such as wireless device 460. Further, relay access point 450 is illustrated as comprising an antenna 451 and transceiver 452 for enabling communication with wireless device 460, processor 453, and a memory 454 for storing instructions that are executed by processor 453. In some embodiments, relay access point 450 may be a home eNodeB. Moreover, although only one transceiver is depicted in each of relay wireless device 440 and relay access point 450, additional transceivers may be incorporated in order to facilitate communication across interface 426 and other network elements.

Further, memory 444 on relay UE 440 may include instructions for selecting a donor access node from among donor access nodes 410, 411, 412, by instructing the relay UE 440 to attach to a first preferred donor access node (e.g. donor access node 410) using a first antenna of the plurality of directional antennae 441. While maintaining the connection with the first preferred donor access node 410 using the first antenna, the relay UE 440 can scan for potential donor access nodes (including donor access nodes 411, 412) using one or more remaining antennae of the plurality of directional antennae 441 and, upon identifying one of potential donor access nodes 411, 412 as a second preferred donor access node, perform a handover from the first preferred donor access node 410 to the second preferred donor access node 411, 412. By virtue of being configured with the plurality of directional antennae 441, the relay UE 440 can remain connected to the first preferred access node 410 using the first directional antenna while scanning for potential donor access nodes 411, 412 using the one or more remaining directional antennae. For example, relay UE 440 can scan for reference signals transmitted from the potential donor access nodes 411, 412. The scanning may be performed by switching to different directional antennae 441 in different directions, and performing measurements from each different antenna prior to switching to the next directional antenna.

Further, operations stored within memory 444 can include instructing relay UE 440 to record reference signal strengths for each reference signal received at the one or more directional antennae 441. For example, the reference signal strengths for each reference signal can be recorded on an internal database on memory 444, along with a primary cell identifier of each potential donor access node 411, 412 that transmitted the reference signal. Further, the scanning and recording can be repeated for the duration of a timer. Subsequent to expiration of the timer, the potential donor access nodes (including all donor access nodes 410, 411, 412) can be ranked based on the reference signal strength. For example, the first preferred donor access node 410 may have been selected by relay UE 440 based on having a top rank. The top rank may be based on, for example, past records of signal measurements. Further, identifying the second preferred donor access node (e.g. donor access node 411) may be based on a rank of the second preferred donor access node 411 being higher than (or rising higher than) a rank of the first preferred donor access node 410 to which the relay UE 440 is attached. For example, the reference signal strength associated with the second preferred donor access node 411 and measured at the remaining one or more directional antennae of relay node 440 may be higher than the reference signal strength associated with the first preferred donor access node 410. Consequently, upon identifying the second preferred donor access node 411, the relay UE 440 initiates a handover from the first preferred donor access node 410 to the second preferred donor access node 411.

Figure 5:
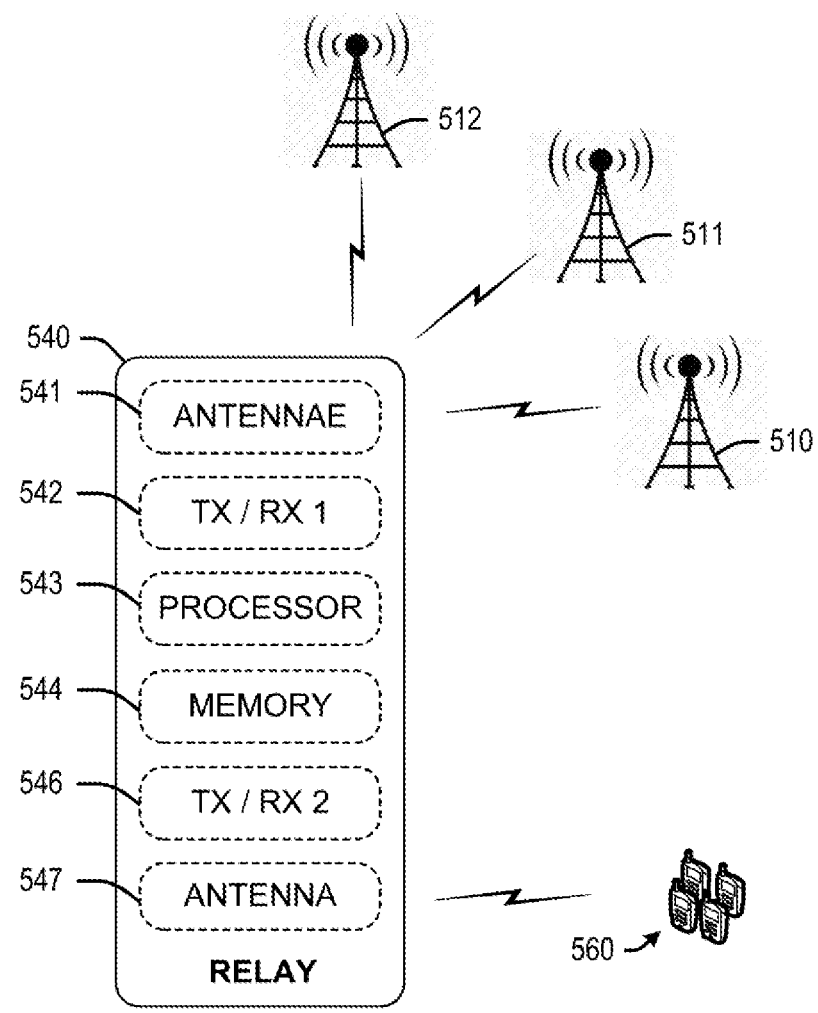
FIG. 5 depicts another exemplary relay node combining a relay wireless device and a relay access point.

In another exemplary embodiment, the relay node may integrate components of both relay wireless device 440 and relay access point 450 into a single unit. FIG. 5 depicts an exemplary relay node 540 of this type. Relay node 540 is illustrated as comprising a plurality of directional antennae 541 for enabling communication with a plurality of donor access nodes 510, 511, 512, one or more transceivers 542, a processor 543, and a memory 544 for storing instructions that are executed by processor 522 as described herein. Relay node 540 further includes another transceiver 546 and antenna 547 for enabling communication with wireless device 560. Memory 544 can include instructions that enable relay node 520 to perform operations similar to those described above with respect to FIG. 4.

In an embodiment, the relay nodes depicted in FIGS. 4-5 can be configured to function as one or more of a layer 1 (L1), layer 2 (L2), or layer 3 (L3) relay. A layer 1 relay functions as a booster or repeater. In other words, a layer 1 relay node performs an amplify and forward (AF) function. RF signals received from a donor access node are amplified and transmitted to end-user wireless devices. Likewise, RF signals received from end-user wireless devices are amplified and transmitted to donor access nodes. Alternatively or in addition, a layer 2 relay node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively, or in addition, a layer 3 relay node also performs a decode and forward function. However, a layer 3 relay node also performs additional processing (such as ciphering and/or data concatenation/segmentation/reassembly). In other words, relay node depicted herein performs demodulation and decoding of the received RF signals (either uplink or downlink), processes received data, then encodes, modulates, and transmits the data to a wireless device.

Figure 6:
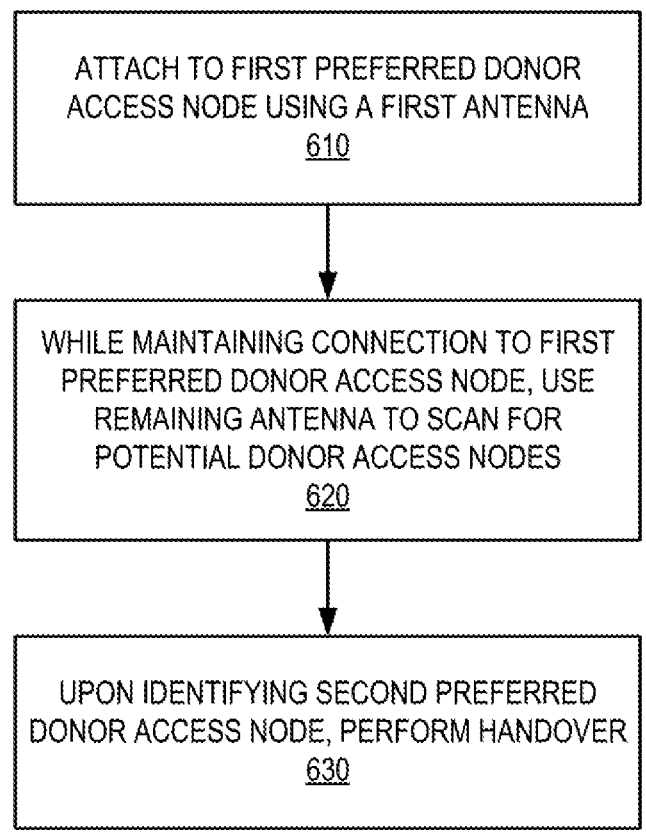
FIG. 6 depicts an exemplary method for selecting a donor access node for a relay node comprising a plurality of directional antennae.

FIG. 6 depicts an exemplary method for selecting a donor access node for a relay node comprising a plurality of directional antennae. The method of FIG. 6 may be implemented by a processing node communicatively coupled to one or more donor access nodes, relay nodes, controller nodes, or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, a relay node is instructed to attach to a first preferred donor access node using a first antenna of the plurality of directional antennae. The relay node can be configured to relay data between an access node and one or more end-user wireless devices attached to the relay node. The relay node may be a small cell access node, a home eNodeB, etc. In an exemplary embodiment, the relay node includes a relay wireless device coupled to a relay access point, and is configured to relay data packets between an access node and an end-user wireless device attached to a wireless air interface deployed by the relay access point. Alternatively, the relay node is a combined unit that includes transceivers configured to communicate with a relay node and to deploy a wireless air interface to which end-user wireless devices can attach. In either case, when providing service to a relay node, the serving access node(s) may be referred to as donor access node(s), and any wireless connection between a donor access node and a relay node may be referred to as a backhaul connection. Further, the donor access node may include an access node of any type, including macrocell access nodes such as Long-Term-Evolution (LTE) eNodeBs or 5G New Radio (NR) gNodeBs, mini access nodes, home eNodeBs or gNodeBs, etc. Further, as described herein, the relay node is configured with a plurality of directional antennae, each of which is oriented such that the relay node can communicate with other network nodes in all directions.

Thus, at 620, while maintaining the connection with the first preferred donor access node using the first directional antenna, the relay node can scan for potential donor access nodes using one or more remaining antennae of the plurality of directional antennae. For example, this can include scanning for reference signals transmitted from the potential donor access nodes. The scanning may be performed by switching to different directional antennae in different directions, and performing measurements from each different antenna prior to switching to the next directional antenna.

At 630, upon identifying a second preferred donor access node from the potential donor access nodes, the relay node may perform a handover from the first preferred donor access node to the second preferred donor access node. Identifying the second preferred donor access node may be based on a reference signal strength associated with the second preferred donor access node and measured at the remaining one or more directional antennae being higher than the reference signal strength associated with the first preferred donor access node. Further, to be selected as a preferred donor access node, the reference signal strength associated with the second preferred donor access node may be higher than the reference signal strength associated with the first preferred donor access node by a threshold. Alternatively, or in addition, the reference signal strength associated with the second preferred donor access node may be higher than the reference signal strength associated with the first preferred donor access node for a period of time, or over a threshold number of cycles of one or more timers. Consequently, upon identifying the second preferred donor access node, the relay node initiates a handover from the first preferred donor access node to the second preferred donor access node.

Further, the relay node is configured to record reference signal strengths for each reference signal received at the one or more remaining antennae. For example, the reference signal strengths for each reference signal can be recorded on an internal database of the relay node, along with a primary cell identifier of each potential donor access node that transmitted the reference signal. Further, the scanning and recording can be repeated for the duration of a timer. Subsequent to expiration of the timer, the potential donor access nodes can be ranked based on the reference signal strength. In an exemplary embodiment, the scanning, recording, and ranking operations can be repeated for the duration of a second timer. The second timer can be longer than the first timer. In an exemplary embodiment, the second timer is an integer multiple of the first timer. For example, upon meeting a predefined number of cycles of the first timer during which scanning and recording operations are performed, the recorded list of potential donor access nodes can be ranked by a signal strength.

In an exemplary embodiment, the first preferred donor access node is selected based on having a top rank. The top rank may be based on, for example, past records of signal measurements. Further, identifying the second preferred donor access node may be based on a rank of the second preferred donor access node being higher than (or rising higher than) a rank of the first preferred donor access node to which the relay node is attached. For example, the reference signal strength associated with the second preferred donor access node and measured at the remaining one or more directional antennae may be higher than the reference signal strength associated with the first preferred donor access node. Further, to be selected as a preferred donor access node, the reference signal strength associated with the second preferred donor access node may be higher than the reference signal strength associated with the first preferred donor access node by a threshold. Alternatively or in addition, the reference signal strength associated with the second preferred donor access node may be higher than the reference signal strength associated with the first preferred donor access node for a period of time, or over a threshold number of cycles of one or more timers. Consequently, upon identifying the second preferred donor access node, the relay node initiates a handover from the first preferred donor access node to the second preferred donor access node.

Figure 7A:
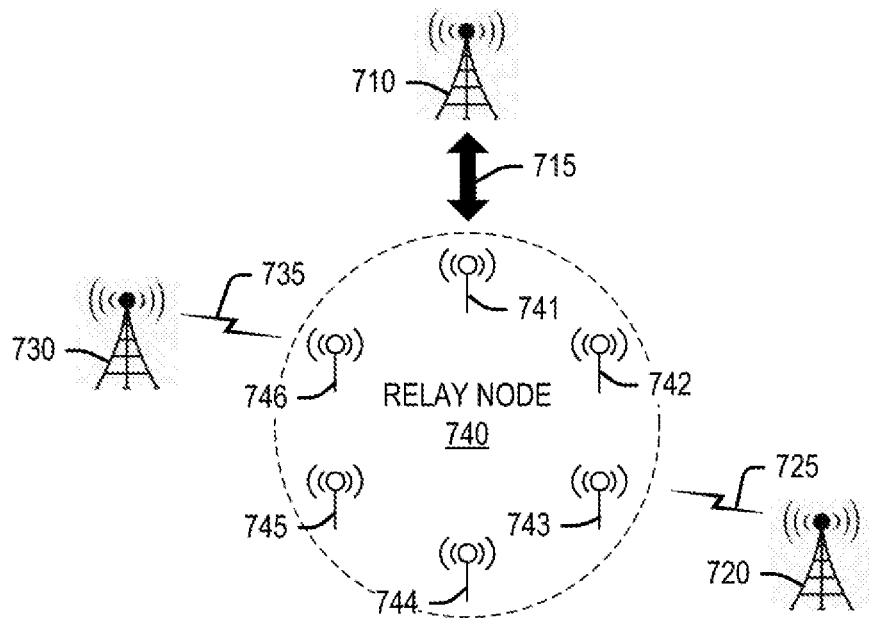
FIGS. 7A-7B depict an exemplary relay node utilizing a plurality of directional antennae to select a donor access node.
Figure 7B:
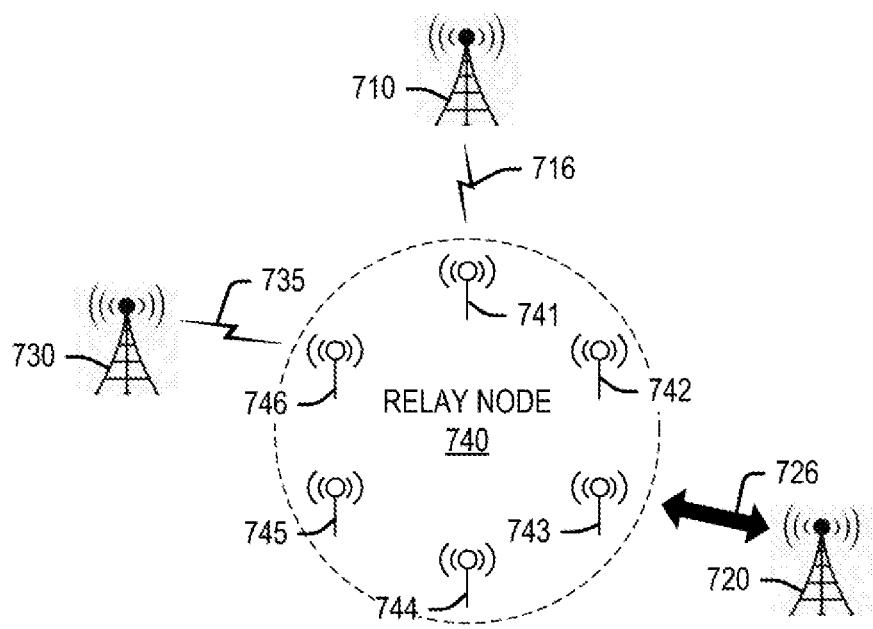

FIGS. 7A-7B depict an exemplary relay node utilizing a plurality of directional antennae to select a donor access node. Relay node 740 is illustrated as comprising a plurality of directional antennae 741, 742, 743, 744, 745, and 746. Although 6 directional antennae are depicted in FIGS. 7A-7B, persons having ordinary skill in the art can envision relay nodes comprising any number of directional antennae in any configuration, in light of this disclosure. Further, access nodes 710, 720, 730 are similar to access nodes 110, 120 in FIG. 1, and relay node 740 may be considered similar to relay node 140. Thus, with reference to FIG. 7A, relay node 740 can be configured to attach to a first preferred donor access node (e.g. donor access node 710) using a first directional antenna 741 of the plurality of directional antennae. Relay node 740 is illustrated as being engaged in a communication session 715 with access node 710, while being able to scan for potential donor access nodes (including donor access nodes 720, 730) using one or more remaining antennae of the plurality of directional antennae. For example, relay node 740 can receive a first reference signal 725 from access node 720 at directional antenna 743, and a second reference signal 735 from access node 730 at directional antenna 746. The scanning may be performed by switching to different directional antennae in different directions, and performing measurements from each different antenna prior to switching to the next directional antenna.

Further, the relay node 740 can record reference signal strengths for each reference signal 725, 735 received at the directional antennae 743, 746 respectively. For example, the reference signal strengths for each reference signal 725, 735 can be recorded on an internal database of the relay node 740, along with a primary cell identifier of each potential donor access node 720, 730. Further, the scanning and recording can be repeated for the duration of a timer. Subsequent to expiration of the timer, the potential donor access nodes (including donor access nodes 710, 720, and 730) can be ranked based on the reference signal strength.

With reference to FIG. 7B, potential donor access node 720 may be identified as a preferred donor access node, and relay node 740 is configured to perform a handover from the first preferred donor access node 710 to the second preferred donor access node 720. Identifying the second preferred donor access node 720 may be based on a rank of the second preferred donor access node being higher than (or rising higher than) a rank of the first preferred donor access node 710. For example, the reference signal strength of reference signal 725 associated with the second preferred donor access node 720 and measured at the directional antenna 743 may be higher than the reference signal strength associated with either reference signal 735 transmitted from potential donor access node 730 and measured at directional antenna 746, or a reference signal from first preferred donor access node 710 measured the directional antenna 741.

Figure 8:
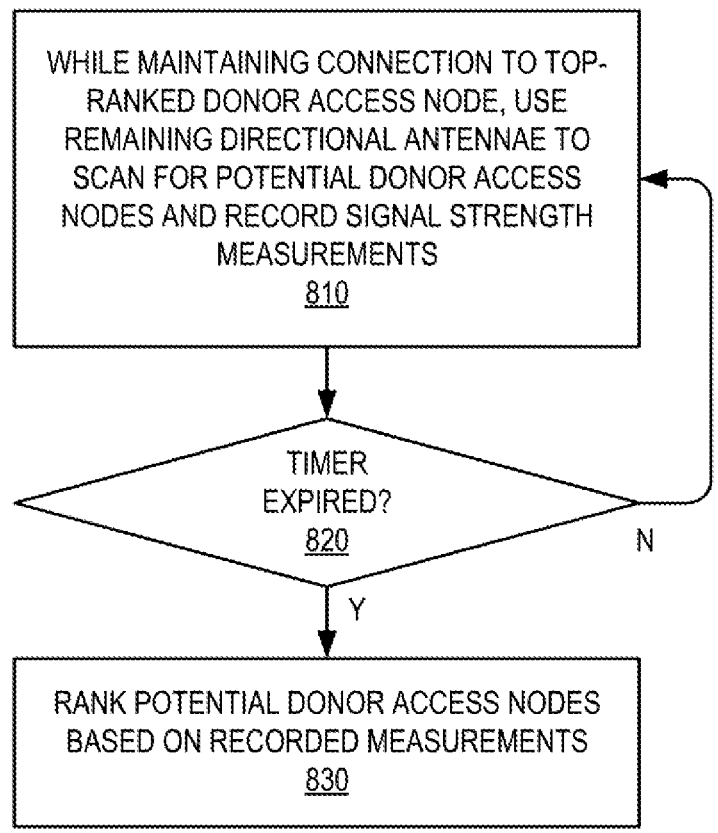
FIG. 8 depicts an exemplary method for recording signal levels of potential donor access nodes by a relay node comprising a plurality of directional antennae.

FIG. 8 depicts an exemplary method for recording signal levels of potential donor access nodes by a relay node comprising a plurality of directional antennae. The method of FIG. 8 may be implemented by a processing node communicatively coupled to one or more donor access nodes, relay nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, a relay node is configured with a plurality of directional antennae is instructed to maintain a connection with a top-ranked donor access node using a first directional antenna and to use one or more remaining directional antennae to scan for potential donor access nodes and to record signal strength measurements. The scanning may be performed by switching to different directional antennae in different directions, and performing measurements from each different antenna prior to switching to the next directional antenna. Further, the relay node is configured to record reference signal strengths for each reference signal received at the one or more remaining antennae. For example, the reference signal strengths for each reference signal can be recorded on an internal database of the relay node, along with a primary cell identifier of each potential donor access node that transmitted the reference signal.

Further, the scanning and recording can be repeated for the duration of a timer. At 820, if the timer is not expired, the scanning and recording continues at 810. However, subsequent to expiration of the timer at 820, the potential donor access nodes can be ranked based on the recorded reference signal strength measurements at 830. The ranking can be based on a reference signal strength associated with each potential donor access node being higher or lower than the reference signal strength associated with another (or preferred) donor access node by a threshold. Alternatively or in addition, the reference signal strength of each potential donor access node may be higher or lower than the reference signal strength associated with another donor access node for a period of time, or over a threshold number of cycles of one or more timers at 820. Consequently, upon identifying the second preferred donor access node having a highest ranked, the relay node initiates a handover from the first preferred donor access node to the second preferred donor access node.

Further in an exemplary embodiment, the scanning, recording, and ranking operations can be repeated for the duration of a second timer. The second timer can be longer than the first timer 820. In an exemplary embodiment, the second timer is an integer multiple of the first timer 820. For example, upon meeting a predefined number of cycles of the first timer 820 during which scanning and recording operations are performed, the recorded list of potential donor access nodes can be ranked at 830 by a signal strength.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting a donor access node for a relay node comprising a plurality of directional antennae, the method comprising:
    attaching to a first preferred donor access node using a first antenna of the plurality of directional antennae;
    while maintaining a connection with the first preferred donor access node using the first antenna, scanning for potential donor access nodes using one or more remaining antennae of the plurality of directional antennae; and
    upon identifying a second preferred donor access node from the potential donor access nodes, performing a handover from the first preferred donor access node to the second preferred donor access node
    wherein the first preferred donor access node is selected based on a past signal strength.

2. The method of claim 1, wherein the scanning using the one or more remaining antennae comprises:
    scanning for reference signals transmitted from the potential donor access nodes using the one or more remaining antennae; and recording reference signal strengths for each reference signal received at the one or more remaining antennae.

3. The method of claim 2, wherein the reference signal strengths for each reference signal are recorded along with a primary cell identifier of each potential donor access node that transmitted the reference signal.

4. The method of claim 2, further comprising repeating the scanning and recording for a duration of a first timer.

5. The method of claim 4, further comprising ranking the potential donor access nodes based on the reference signal strength upon expiration of the first timer.

6. The method of claim 5, further comprising repeating the scanning, recording, and ranking for a duration of a second timer, the second timer being longer than the first timer.

7. The method of claim 6, wherein the second timer is an integer multiple of the first timer.

8. The method of claim 5, wherein the first preferred donor access node is selected based on having a top rank.

9. The method of claim 5, further comprising identifying the second preferred donor access node upon a rank of the second preferred donor access node being higher than a rank of the first preferred donor access node.

10. The method of claim 9, wherein each directional antennae is configured to scan a different direction.

11. A system for selecting a donor access node for a relay node comprising a plurality of directional antennae, the system comprising:
a processing node; and
a processor coupled to the processing node, the processor being configured to perform operations comprising:
attaching to a first preferred donor access node from among a plurality of potential donor access nodes using a first directional antenna;
while maintaining a connection with the first preferred donor access node using the first directional antenna, identifying additional preferred donor access nodes from among the plurality of potential donor access nodes using a second directional antenna;
ranking the additional preferred donor access nodes and the first preferred donor access node based on a signal strength from each donor access node; and
performing a handover from the first preferred donor access node to a highest-ranked additional preferred donor access node,
wherein the first preferred donor access node is selected based on a past signal strength.

12. The system of claim 11, wherein identifying the additional preferred donor access nodes comprises scanning for reference signals transmitted from each additional preferred donor access node.

13. The system of claim 12, wherein the operations further comprise recording reference signal strengths for each reference signal received at the second directional antenna.

14. The system of claim 13, wherein the operations further comprise correlated correlating each recorded reference signal strength corresponding with each additional preferred donor access node.

15. The system of claim 11, wherein the additional preferred donor access nodes are ranked based on the signal strength from each donor access node exceeding another signal strength by a threshold.

16. The system of claim 11, wherein the identifying and ranking are performed periodically.

17. A processing node for selecting a donor access node for a relay node comprising a plurality of directional antennae, the processing node being configured to perform operations comprising:
identifying a first preferred donor access node from among a plurality of potential donor access nodes;
attaching to the first preferred donor access node using a first directional antenna;
while maintaining a connection with the first preferred donor access node, identifying additional preferred donor access nodes from among the plurality of potential donor access nodes using one or more additional directional antennae; and
ranking the additional preferred donor access nodes and the first preferred donor access node based on a signal strength received at each of the first directional antennae and the one or more additional directional antennae,
wherein a handover is performed from the first preferred donor access node to a second preferred donor access node upon identifying the second preferred donor access node from among the additional preferred donor access nodes, and
wherein the first preferred donor access node is selected based on a past signal strength.

18. The processing node of claim 17, wherein identifying the additional preferred donor access nodes comprises scanning for reference signals transmitted from each additional preferred donor access node.

19. The processing node of claim 18, wherein the operations further comprise recording reference signal strengths for each reference signal received at the one or more additional directional antennae.

* * * * *